United States Patent
Webb et al.

(10) Patent No.: US 12,360,803 B2
(45) Date of Patent: Jul. 15, 2025

(54) DYNAMIC SCHEDULING PLATFORM FOR AUTOMATED COMPUTING TASKS

(71) Applicant: Accenture Global Solutions Limited, Dublin (IE)

(72) Inventors: Anthony R. Webb, Point Cook (AU); Luke Higgins, West Pymble (AU); Badrinath Parameswar, Chennai (IN); Aditi Kulkarni, Bangalore (IN); Genevieve Elizabeth Kuai Ying Lee, Dulwich Hill (AU); Rajendra Prasad Tanniru, Basking Ridge, NJ (US); Koushik M. Vijayaraghavan, Chennai (IN)

(73) Assignee: Accenture Global Solutions Limited, Dublin (IE)

( * ) Notice: Subject to any disclaimer, the term of this patent is extended or adjusted under 35 U.S.C. 154(b) by 552 days.

(21) Appl. No.: 17/817,880

(22) Filed: Aug. 5, 2022

(65) Prior Publication Data

US 2024/0045713 A1 Feb. 8, 2024

(51) Int. Cl.
*G06F 9/48* (2006.01)
*G06F 9/50* (2006.01)

(52) U.S. Cl.
CPC .......... *G06F 9/4881* (2013.01); *G06F 9/5055* (2013.01)

(58) Field of Classification Search
None
See application file for complete search history.

(56) References Cited

U.S. PATENT DOCUMENTS

| | | | |
|---|---|---|---|
| 5,838,968 A * | 11/1998 | Culbert | G06F 9/5011 718/103 |
| 9,692,811 B1 * | 6/2017 | Tajuddin | G06F 11/3616 |
| 9,838,248 B1 * | 12/2017 | Grammel | H04L 41/0681 |
| 9,912,517 B1 * | 3/2018 | Ramalingam | G06F 9/5061 |
| 9,983,906 B2 * | 5/2018 | Caufield | G06F 9/50 |
| 10,833,933 B2 * | 11/2020 | Sedayao | G06F 9/5072 |
| 11,144,425 B1 * | 10/2021 | Salunke | H04W 12/37 |
| 11,347,623 B1 * | 5/2022 | Yang | G06F 40/205 |
| 11,556,705 B2 * | 1/2023 | Brooks | G06F 40/289 |
| 2002/0120744 A1 * | 8/2002 | Chellis | G06F 9/50 709/224 |

(Continued)

*Primary Examiner* — Adam Lee
(74) *Attorney, Agent, or Firm* — POLSINELLI PC

(57) ABSTRACT

In some implementations, a scheduling platform may receive task information regarding a set of tasks for execution using a set of computing resources, wherein the task information includes, for the set of tasks, at least one of: a run time parameter, a priority parameter, or a success rate parameter. The scheduling platform may communicate with a computing resource management device to obtain first computing resource information regarding the set of computing resources. The scheduling platform may generate a first assignment of the set of tasks to the set of computing resources. The scheduling platform may transmit assignment information identifying the first assignment. The scheduling platform may receive second computing resource information. The scheduling platform may generate a second assignment of the set of tasks to the set of computing resources. The scheduling platform may transmit second assignment information identifying the second assignment.

20 Claims, 9 Drawing Sheets

(56) References Cited

U.S. PATENT DOCUMENTS

| | | | |
|---|---|---|---|
| 2005/0166207 A1* | 7/2005 | Baba | G06F 9/5066 718/105 |
| 2006/0005180 A1* | 1/2006 | Nefian | G06F 8/443 717/158 |
| 2007/0162720 A1* | 7/2007 | Branda | G06F 9/5077 711/173 |
| 2007/0226698 A1* | 9/2007 | Cascaval | G06F 9/45516 717/127 |
| 2009/0089554 A1* | 4/2009 | Blackmon | G06F 11/3466 712/E9.028 |
| 2009/0094590 A1* | 4/2009 | Mendelson | G06F 8/443 717/156 |
| 2009/0282095 A1* | 11/2009 | Alami | G06F 9/5027 709/224 |
| 2010/0153700 A1* | 6/2010 | Capps, Jr. | G06F 9/3887 712/E9.035 |
| 2010/0235349 A1* | 9/2010 | Kuno | G06F 16/217 707/718 |
| 2010/0318658 A1* | 12/2010 | Zorn | G06F 9/5066 709/226 |
| 2011/0035752 A1* | 2/2011 | Krishnakumar | G06F 9/4881 718/103 |
| 2012/0017218 A1* | 1/2012 | Branson | G06F 9/50 718/104 |
| 2012/0084789 A1* | 4/2012 | Iorio | G06F 9/5066 718/105 |
| 2012/0218268 A1* | 8/2012 | Accola | G06F 11/0715 345/440 |
| 2012/0233609 A1* | 9/2012 | Blythe | G06F 11/3409 718/1 |
| 2012/0311544 A1* | 12/2012 | Higgs | G06F 11/3466 717/130 |
| 2013/0055283 A1* | 2/2013 | Mopur | G06F 9/5083 718/104 |
| 2013/0080760 A1* | 3/2013 | Li | G06F 11/3447 713/100 |
| 2013/0111479 A1* | 5/2013 | Chen | G06F 11/3433 718/100 |
| 2013/0139130 A1* | 5/2013 | Anjan | G06F 11/34 717/131 |
| 2013/0166712 A1* | 6/2013 | Chandramouli | G06F 9/5072 709/223 |
| 2013/0332610 A1* | 12/2013 | Beveridge | G06F 9/45558 709/226 |
| 2014/0344316 A1* | 11/2014 | Baranowsky | G06F 11/3034 707/827 |
| 2015/0052250 A1* | 2/2015 | Doganata | H04L 47/78 709/226 |
| 2016/0034307 A1* | 2/2016 | Wilkinson | G06F 9/5011 718/104 |
| 2016/0179583 A1* | 6/2016 | Eide | G06F 9/5077 713/320 |
| 2016/0255428 A1* | 9/2016 | Ghimire | H04Q 11/0062 398/79 |
| 2018/0032373 A1* | 2/2018 | Chen | G06F 9/5038 |
| 2019/0036835 A1* | 1/2019 | Chakra | H04L 41/40 |
| 2019/0303117 A1* | 10/2019 | Kocberber | G06F 11/3466 |
| 2019/0392331 A1* | 12/2019 | Vincent | G06F 11/3452 |
| 2020/0034746 A1* | 1/2020 | Poitras | G06F 11/302 |
| 2020/0057675 A1* | 2/2020 | Dias | G06N 3/086 |
| 2020/0089533 A1* | 3/2020 | Guha | G06F 9/5072 |
| 2020/0110691 A1* | 4/2020 | Bryant | G06F 11/3457 |
| 2020/0133755 A1* | 4/2020 | Bansal | H04L 41/18 |
| 2020/0364087 A1* | 11/2020 | Castinado | G06F 9/5011 |
| 2021/0176189 A1* | 6/2021 | Rabipour | G06F 9/505 |
| 2021/0365275 A1* | 11/2021 | Vattikuti | G06Q 10/109 |
| 2022/0222446 A1* | 7/2022 | Jangid | G06F 11/0709 |
| 2023/0259401 A1* | 8/2023 | Zorin | G06F 9/4881 718/104 |
| 2023/0325234 A1* | 10/2023 | Arumugam Maharaja | G06F 9/4881 718/104 |

* cited by examiner

DYNAMIC SCHEDULING PLATFORM FOR AUTOMATED COMPUTING TASKS

BACKGROUND

Computing tasks may be scheduled and assigned to a set of computing resources. For example, computational tasks may be assigned to processors for processing, communication tasks may be assigned to network links for communication, or automation tasks may be assigned to a robotic process automation system for automatic completion. Computing systems may have limited and/or changing resource sets. For example, a computing system may have a particular amount of processing capability in a resource pool for completing processing tasks and, periodically, some of the processing capability in the resource pool may go offline as a result of errors, maintenance, or re-assignment to other resource pools.

SUMMARY

Some implementations described herein relate to a method. The method may include receiving, by a scheduling platform, task information regarding a set of tasks for execution using a set of computing resources, wherein the task information includes, for the set of tasks, at least one of: a run time parameter, a priority parameter, or a success rate parameter. The method may include communicating, by the scheduling platform, with a computing resource management device to obtain first computing resource information regarding the set of computing resources, wherein the first computing resource information includes, for the set of computing resources, at least one of: an availability parameter, a type parameter, or a capacity parameter. The method may include generating, by the scheduling platform, a first assignment of the set of tasks to the set of computing resources using an evaluation algorithm applied to the task information and the first computing resource information to optimize the execution of the set of tasks using the set of computing resources. The method may include transmitting, by the scheduling platform, assignment information identifying the first assignment of the set of tasks to the computing resource management device to cause the execution of the set of tasks using the set of computing resources. The method may include receiving, by the scheduling platform and during the execution of the set of tasks using the set of computing resources, second computing resource information, wherein the second computing resource information and the first computing resource information include at least one common parameter with a different value. The method may include generating, by the scheduling platform, a second assignment of the set of tasks to the set of computing resources using the evaluation algorithm applied to the task information and the second computing resource information to re-optimize the execution of the set of tasks using the set of computing resources. The method may include transmitting, by the scheduling platform, second assignment information identifying the second assignment of the set of tasks to the computing resource management device to cause the execution of the set of tasks using the set of computing resources.

Some implementations described herein relate to a scheduling platform. The scheduling platform may include one or more memories and one or more processors coupled to the one or more memories. The scheduling platform may be configured to receive task information regarding a set of tasks for execution using a set of computing resources, wherein the task information includes, for the set of tasks, at least one of: a run time parameter, a priority parameter, or a success rate parameter. The scheduling platform may be configured to communicate with a computing resource management device to obtain first computing resource information regarding the set of computing resources, wherein the first computing resource information includes, for the set of computing resources, at least one of: an availability parameter, a type parameter, or a capacity parameter. The scheduling platform may be configured to generate a first assignment of the set of tasks to the set of computing resources using an evaluation algorithm applied to the task information and the first computing resource information to optimize the execution of the set of tasks using the set of computing resources. The scheduling platform may be configured to transmit assignment information identifying the first assignment of the set of tasks to the computing resource management device to cause the execution of the set of tasks using the set of computing resources. The scheduling platform may be configured to detect a failure of a task, of the set of tasks, on a computing resource of the set of computing resources. The scheduling platform may be configured to generate, based on the failure of the task, a second assignment of the set of tasks to the set of computing resources to re-optimize the execution of the set of tasks using the set of computing resources. The scheduling platform may be configured to transmit second assignment information identifying the second assignment of the set of tasks to the computing resource management device to cause the execution of the set of tasks using the set of computing resources.

Some implementations described herein relate to a non-transitory computer-readable medium that stores a set of instructions for a scheduling platform. The set of instructions, when executed by one or more processors of the scheduling platform, may cause the scheduling platform to receive task information regarding a set of tasks for execution using a set of computing resources, wherein the task information includes, for the set of tasks, at least one of: a run time parameter, a priority parameter, or a success rate parameter. The set of instructions, when executed by one or more processors of the scheduling platform, may cause the scheduling platform to communicate with a computing resource management device to obtain first computing resource information regarding the set of computing resources, wherein the first computing resource information includes, for the set of computing resources, at least one of: an availability parameter, a type parameter, or a capacity parameter. The set of instructions, when executed by one or more processors of the scheduling platform, may cause the scheduling platform to generate a first assignment of the set of tasks to the set of computing resources using an evaluation algorithm applied to the task information and the first computing resource information to optimize the execution of the set of tasks using the set of computing resources. The set of instructions, when executed by one or more processors of the scheduling platform, may cause the scheduling platform to transmit assignment information identifying the first assignment of the set of tasks to the computing resource management device to cause the execution of the set of tasks using the set of computing resources. The set of instructions, when executed by one or more processors of the scheduling platform, may cause the scheduling platform to monitor a feedback stream to detect feedback relating to the set of computing resources. The set of instructions, when executed by one or more processors of the scheduling platform, may cause the scheduling platform to generate, based on the feedback relating to the set of computing resources, a second assignment of the set of tasks to the set of computing resources to re-optimize the execution of the set of tasks using the set of computing resources. The set of instructions, when executed by one or more processors of the scheduling platform, may cause the scheduling platform to transmit second assignment information identifying the second assignment of the set of tasks to the computing resource management device to cause the execution of the set of tasks using the set of computing resources.

DETAILED DESCRIPTION

Figure 1A:
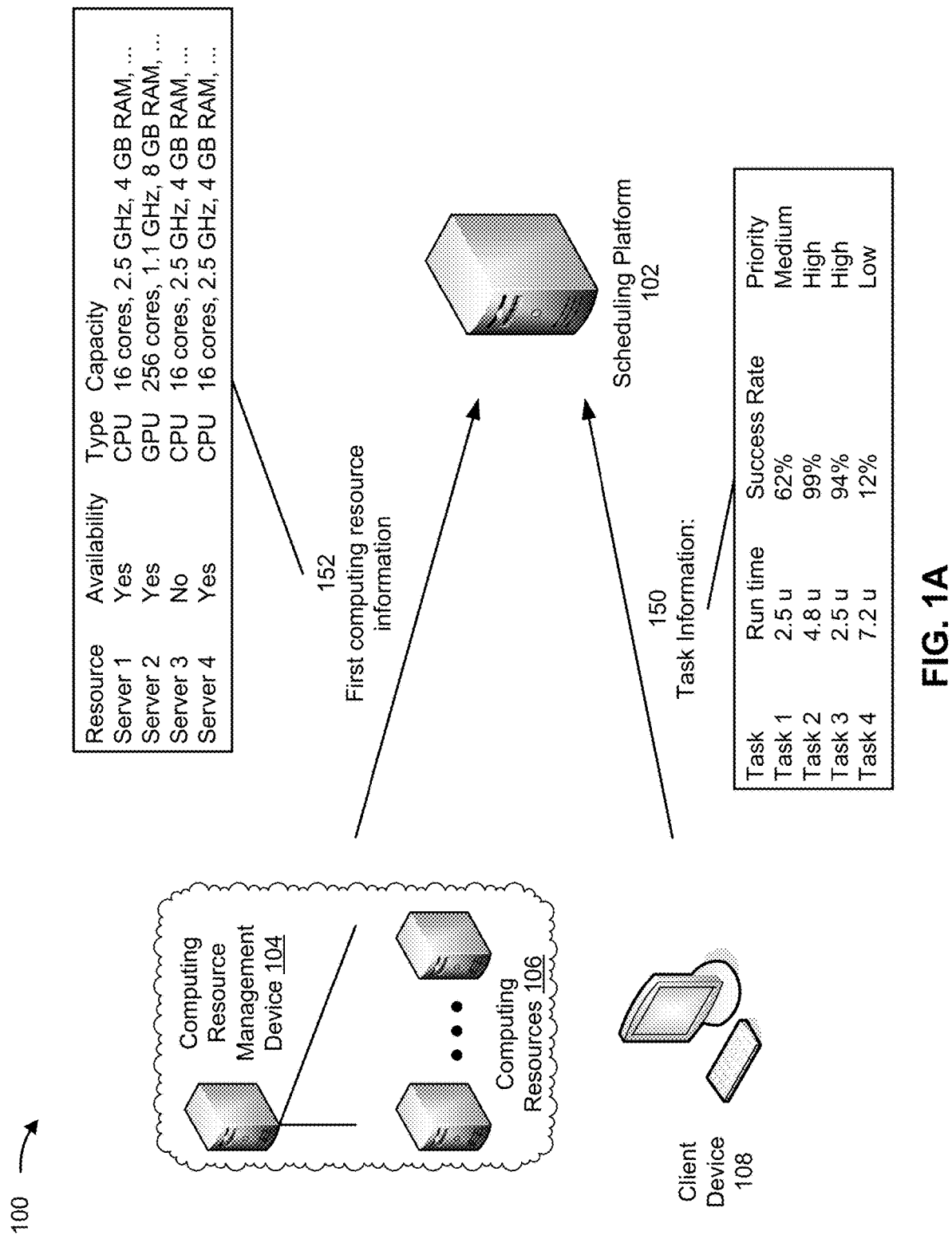
FIGS. 1A-1D are diagrams of an example implementation associated with dynamic scheduling for automated computing tasks.

The following detailed description of example implementations refers to the accompanying drawings. The same reference numbers in different drawings may identify the same or similar elements.

Robotic process automation (RPA) is a process automation technology in which computing resources complete a set of actions to automate a task associated with a computing system. The set of actions may be generated by monitoring a user's use of a graphical user interface to detect the set of actions being performed by the user and generating scripting to enable the computing resource to recreate the set of actions when instructed by a task scheduler. RPA can reduce a difficulty in automating task completion relative to other methods for task automation, such as using application programming interfaces or dedicated scripting languages. Additionally, RPA may enable cross-system automation. For example, although other techniques for automation may be limited to a single software environment, RPA may enable automation of tasks involving interaction between multiple software environments. Moreover, RPA may reduce cost, increase speed, increase accuracy, increase consistency, and improve quality relative to manual completion of tasks or other techniques for automation. However, RPA can be resource intensive. For example, a scheduler may need to assign computing resources to complete RPA tasks. The scheduler may generate a static schedule, such as having a set of computing resources perform a set of tasks (e.g., RPA tasks) sequentially at a configured time of day.

However, during completion of the set of tasks using the set of computing resources, the set of computing resources may change, such as based on a computing resource becoming unavailable, failing, updating, or going down for maintenance. Moreover, in complex computing environments, task completion may fail as a result of unexpected changes. For example, when a computing resource is simulating a set of actions in a computing environment, an unexpected pop-up in the computing environment may result in an interruption to the set of actions (e.g., a computing-resource initiated mouse click occurring within the pop-up rather than on a button behind the pop-up), which can result in a task failing to be completed. Furthermore, when computing resources are assigned toward task completion, other system processes may be slowed down based on not having access to the assigned computing resources, resulting in poor user experience or errors within a resource pool.

Some implementations described herein provide for dynamic scheduling for automated computing tasks. For example, a scheduling platform may generate a first assignment of tasks to a set of computing resources based on a machine learning model trained for optimizing task assignment based on characteristics, such as task run time, task priority, task success rate, resource availability, resource type, or resource capacity, among other examples. In this way, the scheduling platform optimizes resource assignment to maximize a likelihood of task completion without any negative impacts to a system that includes a resource pool from which the scheduling platform is scheduling resources. Additionally, or alternatively, the scheduling platform may monitor the resource pool and the system to detect a change to the resource pool, a failure of a task, or a negative impact to the system. In this case, when a triggering event is detected, the scheduling platform may generate a second assignment of tasks to the set of computing resources to re-optimize the task assignment based on the triggering event. In this way, the scheduling platform enables dynamic updating of scheduling of computing resources for task completion, thereby increasing a likelihood of task completion relative to a static assignment of computing resources and a static schedule.

FIGS. 1A-1D are diagrams of an example implementation 100 associated with dynamic scheduling for automated computing tasks. As shown in FIGS. 1A-1D, example implementation 100 includes a scheduling platform 102, a computing resource management device 104, a set of computing resources 106, and a client device 108. These devices are described in more detail below in connection with FIG. 3 and FIG. 4.

As shown in FIG. 1A, and by reference number 150, the scheduling platform 102 may obtain task information. For example, the scheduling platform 102 may communicate with the client device 108 to receive the task information regarding a set of tasks for scheduling and assignment to the set of computing resources 106. In some implementations, the task information may include information regarding a set of parameters or characteristics of the set of tasks. For example, the task information may include information identifying an expected run time or duration for each task (e.g., 2.5 units (u) of time), a success rate at completing each task, or a priority for each task, among other examples. Additionally, or alternatively, the task information may include information regarding on which computing resources, software resources, operating systems, or types of devices a task may be run. In some implementations, the scheduling platform 102 may determine a run time parameter based on run time information included in the task information. For example, the scheduling platform 102 may apply a probability density function to a set of historical run times (e.g., previously observed or measured run times) for a set of historical tasks (e.g., previously completed or failed tasks). In this case, the scheduling platform 102 may use the probability density function to generate an ordering of possible outcomes for run time based on a likelihood of each possible outcome. In some implementations, the task information may include information regarding when the tasks are to be scheduled for, such as a particular period of day.

As further shown in FIG. 1A, and by reference number 152, the scheduling platform 102 may obtain first computing resource information. For example, the scheduling platform 102 may communicate with the computing resource management device 104 (e.g., an orchestrator of a cloud computing network) to receive computing resource information regarding the set of computing resources 106. In some implementations, the computing resource information may include information regarding a set of parameters or characteristics of the set of computing resources 106. For example, the computing resource information may include information identifying an availability of each computing resource 106 for task assignment, a type of each computing resource 106 (e.g., whether a computing resource 106 is associated with a central processing unit (CPU), a graphical processing unit (GPU), a network card (e.g., network interface card (NIC)), an audio processing unit (APU), a field programmable gate array (FPGA), or a system-on-chip (SoC)), or a capacity of each computing resource 106 (e.g., a quantity of cores, a processor frequency, or a memory), among other examples. Additionally, or alternatively, the computing resource information may include information identifying whether a computing resource 106 can attempt to auto-heal or auto-recover after a failure or a maximum quantity of permitted attempts at an auto-recovery after a failure, among other examples.

In some implementations, the scheduling platform 102 may classify a computing resource 106 into a particular classification, such as classifying the computing resource 106 based on a type of hardware. In this case, the scheduling platform 102 may assign tasks to the computing resource 106 based on the particular classification, such as by assigning computational tasks to a CPU type of computing resource 106, image processing tasks to a GPU type of computing resource 106, or communication tasks to a network card type of computing resource 106, among other examples.

In some implementations, the scheduling platform 102 may receive health information regarding the set of computing resources 106. For example, the scheduling platform 102 may receive information identifying a CPU utilization, a memory utilization, or an available disk space, among other examples (e.g., with respect to other uses to which the computing resources 106 may be assigned). In this case, the scheduling platform 102 may determine whether to assign a task to a computing resource 106 based on the health information of the computing resource 106.

In some implementations, the scheduling platform 102 may query one or more computing resources 106 to obtain computing resource information, such as the first computing resource information. For example, the scheduling platform 102 may query, via the computing resource management device 104, a computing resource 106 to determine status information for the computing resource 106 (e.g., whether the computing resource 106 is available, whether the computing resource 106 will become available at a particular time, or whether a computing device associated with the computing resource 106 is locked, logged on, or offline). In this case, the scheduling platform 102 may use the status information for assigning a task to the computing resource 106. For example, when a task is an RPA task that includes the computing resource 106 simulating cursor movements to navigate a set of graphical user interfaces (GUIs), the scheduling platform 102 may select a computing resource 106 associated with a computing device that is logged on. In this way, by deploying the computing device associated with computing resource 106, the computing resource 106 can simulate cursor movements on the computing device to complete the RPA task. Alternatively, when the computing resource 106 is locked or offline, the scheduling platform 102 may determine to modify a task to include RPA-based simulated cursor movements or keyboard keystrokes to transfer the computing device from the locked or offline state to the logged on state. Similarly, the scheduling platform 102 may query the computing resource 106 to determine whether a software resource, which is to be controlled as part of an RPA task, is present on a computing device associated with the computing resource 106. In this case, the scheduling platform 102 may select the computing resource 106 that includes the software resource for completing a task that includes usage of the software resource. Alternatively, the scheduling platform 102 may cause the software resource to be deployed and/or installed on the computing resource 106 to enable assignment of a task to the computing resource 106. Additionally, or alternatively, the scheduling platform 102 may reassign a task from a first computing resource 106 to a second computing resource 106 when the scheduling platform 102 determines that a software resource on the first computing resource 106 has become unavailable (e.g., as a result of received update information), thereby reducing a likelihood of a failure resulting from an unavailable software resource.

Figure 1B:
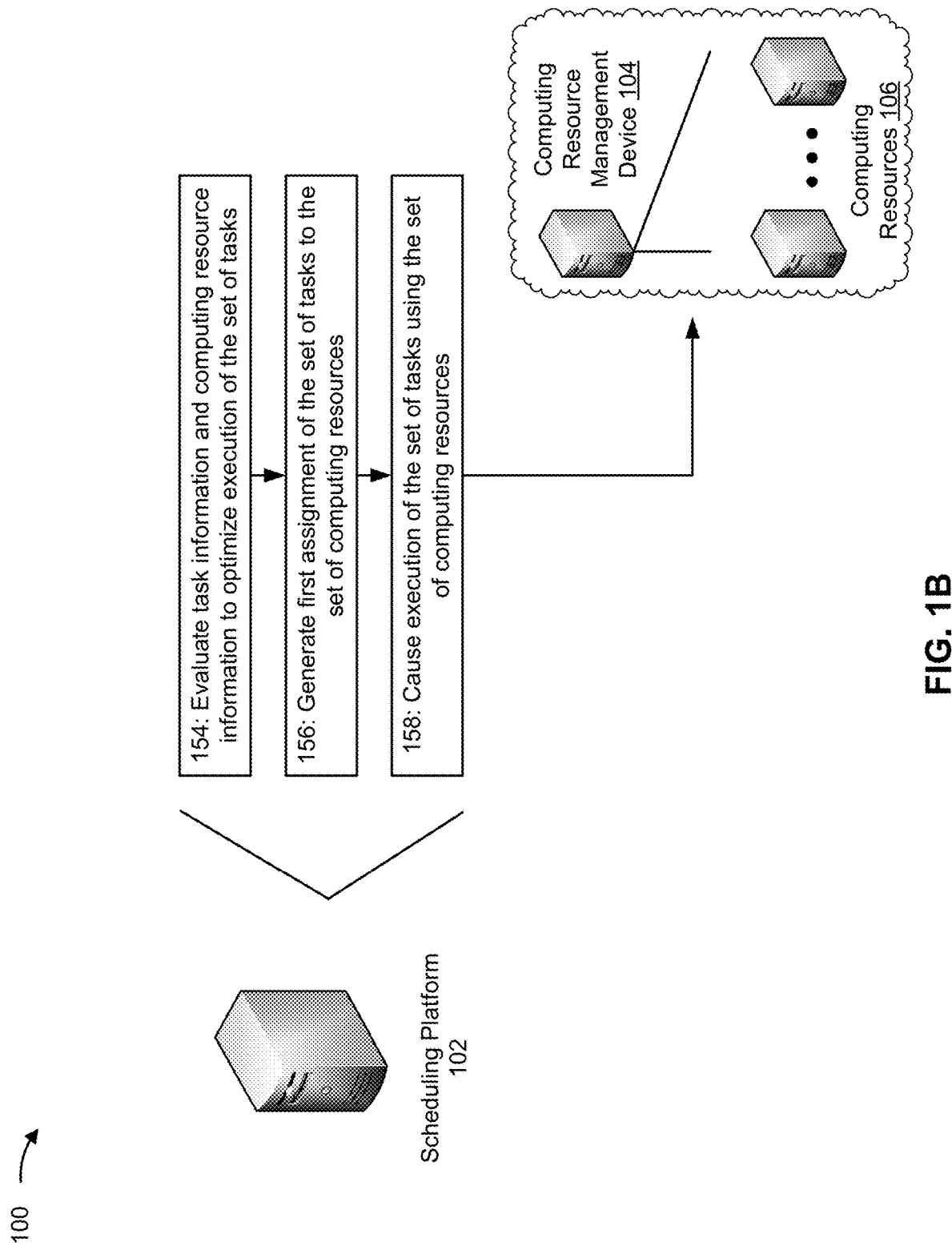

As shown in FIG. 1B, and by reference number 154, the scheduling platform 102 may evaluate task information and computing resource information to optimize execution of the set of tasks. For example, the scheduling platform 102 may use an evaluation algorithm to evaluate the task information and the first computing resource information to generate a first assignment of the set of tasks to the set of computing resources 106, as shown by reference number 156. In this case, the evaluation algorithm may be a machine learning model trained for generating optimized assignments of tasks to computing resources, as described in more detail with regard to FIG. 2. For example, the scheduling platform 102 may use an artificial intelligence algorithm and/or an advanced statistical algorithm (e.g., a probability density function or low pass filtering function) to predict a likelihood of a set of scenarios for execution of the set of tasks using the set of computing resources 106. In this case, the scheduling platform 102 may detect anomalies in process execution times and perform impact analysis on possible schedule changes to determine an optimized schedule. The probability density function or low pass filtering function may be applied to managing a capacity of the set of computing resources 106, predicted run times for completing tasks using the set of computing resources 106, or predicting a delay associated with automated completion of the set of tasks, among other examples. In some implementations, the scheduling platform 102 may use a cost function to calculate a relative level of optimization for different possible assignments of tasks to computing resources 106.

In some implementations, the scheduling platform 102 may generate an assignment of tasks to computing resources 106 based on resource information. For example, the scheduling platform 102 may determine an expected resource utilization for a task, may identify a computing resource 106 with a threshold level of resource availability (e.g., the threshold level may correspond to the expected resource utilization), and may assign the task to the computing resource 106 based on the computing resource 106 having the threshold level of resource availability.

In some implementations, the scheduling platform 102 may assign a task to a computing resource 106 based on status information associated with the computing resource 106. For example, as described above, the scheduling platform 102 may assign a task that includes control of a cursor of a computing device associated with the computing resource 106 based on the computing device being logged on. Additionally, or alternatively, the scheduling platform 102 may cause a modification of the task to enable the computing device to be logged on by the computing resource 106 to complete the task (e.g., when the computing device is not already logged on). In some implementations, as described above, the scheduling platform 102 may assign a task to a computing resource 106 that includes a software resource associated with the task. Additionally, or alternatively, the scheduling platform 102 may cause the software resource to be deployed to and/or installed on the computing resource 106 to enable completion of the task on the computing resource 106.

In some implementations, the scheduling platform 102 may execute a genetic algorithm on one or more parameters to generate an assignment of tasks to the computing resources 106, such as the first assignment of tasks to the computing resources 106. For example, the scheduling platform 102 may execute the genetic algorithm on a priority parameter, a run time parameter, a success rate parameter, or a failure reason parameter (e.g., an identified reason that a task has failed previously) to determine a scheduling and assignment of the set of tasks. For example, the genetic algorithm may be used (e.g., with schedule permutations as chromosomes of the genetic algorithm) with a cost function, to analyze a process priority, a historical run time (e.g., from a probability density function), a failure reason (e.g., a type of process that is more likely than others to fail), and a historical failure rate to determine an optimized assignment of a task to a computing resource 106. In this case, when evaluating the genetic algorithm, the scheduling platform 102 may select a chromosome based on a fitness value, the scheduling platform 102 performs a crossover procedure to produce a new schedule, and the process is repeated until a most optimized schedule is generated.

As further shown in FIG. 1B, and by reference number 158, the scheduling platform 102 may cause execution or completion of the set of tasks using the set of computing resources 106. For example, the scheduling platform 102 may communicate with the computing resource management device 104 to transmit the first assignment of the set of tasks to the set of computing resources 106. In this case, the computing resource management device 104 may communicate with each computing resource 106 to cause execution of each task in accordance with the first assignment of the set of tasks.

Figure 1C:
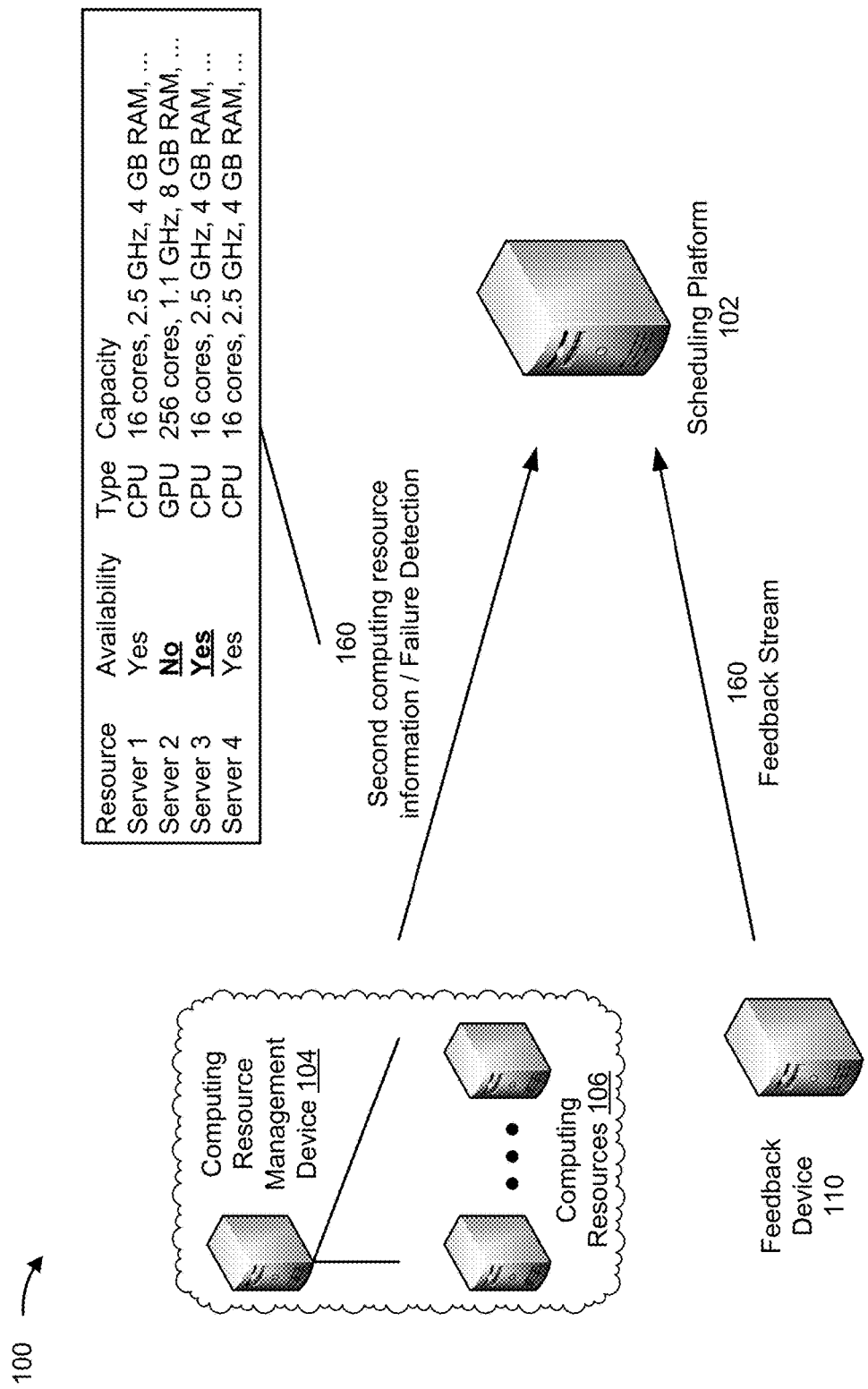

As shown in FIG. 1C, and by reference number 160, the scheduling platform 102 may detect an event, based on monitoring an automated digital input feed, triggering update of an assignment of a set of tasks to a set of computing resources 106. For example, the scheduling platform 102 may receive second computing resource information identifying a change from the first computing resource information. In this case, the second computing resource information may indicate that a computing resource 106 has become available, a computing resource 106 has become unavailable, or an amount of resources of a computing resource 106 that are available has changed (e.g., at a first time 25% of a computing resource 106's capacity was available for completing the set of tasks, and at a second time 50% of the computing resource 106's capacity is available for completing the set of tasks, such as based on other computing tasks assigned to the computing resource 106 being completed), among other examples.

Additionally, or alternatively, the scheduling platform 102 may detect a failure associated with completion of a task. For example, as described above, when completing an RPA task that includes simulated cursor movements, an unexpected popup on a computing device can result in the RPA task causing an incorrect cursor selection, which can cause completion of the RPA task to fail. In some implementations, the scheduling platform 102 may detect a failure based on monitoring a data stream for one or more data anomalies. For example, the scheduling platform 102 may monitor a health of a set of RPA bots (e.g., from monitoring a log), a CPU utilization of a computing resource 106, a bandwidth utilization associated with a network connection, or a memory utilization of a computing resource 106. In this case, the scheduling platform 102 may analyze the health of the one or more data anomalies using an analysis algorithm, such as a low pass duration algorithm (e.g., an algorithm based on a low pass filter), to predict whether completion of the tasks will occur successfully or whether a failure will occur. Additionally, or alternatively, the scheduling platform 102 may determine whether an error will occur that will prevent the set of tasks from being completed (e.g., resulting in an infinite run time for the set of tasks), in which case the scheduling platform 102 may break execution of the set of tasks and determine that a failure has occurred. In some implementations, the scheduling platform 102 may maintain a timer for a task and may, after the timer exceeds a threshold, determine that an error has occurred resulting in a task failure. In this case, the timer may be based on the expected run time for the task, such as having the threshold set at a 99th percentile for the expected run time for the task (or any other threshold level).

In some implementations, the scheduling platform 102 may perform image processing based on detecting the failure of a task. For example, the scheduling platform 102 may detect a failure of a task and obtain a screenshot of a screen or GUI in which the task was being attempted when the task failed. In this case, the scheduling platform 102 may apply an optical character recognition (OCR) algorithm to parse the image of the screen or GUI and may apply a natural language processing algorithm to an output of the OCR algorithm. The scheduling platform 102 may use the output of the natural language processing algorithm to identify a characteristic of the failure of the task, such as a failure reason (e.g., a presence of a pop-up or a login failure in an authentication system). In another example, the scheduling platform 102 may apply an object recognition algorithm to parse the image of the screen or GUI, such as to identify a pop-up object in the screen, from which the scheduling platform 102 may identify the characteristic of the failure of the task. The scheduling platform 102 may modify the task and/or determine a second assignment of tasks to computing resources 106 based on the characteristic of the failure of the task. For example, the scheduling platform 102 may change an order of tasks to avoid the pop-up or modify the task to enable authentication to continue after a login failure (e.g., via another login attempt or a password recovery attempt).

In another example, the scheduling platform 102 may obtain an error log associated with the failure of the task and may parse the error log (e.g., using natural language processing or another technique) to identify the characteristic of the failure of the task, from which the scheduling platform 102 may modify the task and/or determine a second assignment of tasks to computing resources 106. For example, the error log may include unstructured text, such as a file path, a code line number, or a string, and the scheduling platform 102 may apply a natural language processing algorithm to classify the failure of the task into an error category based on the unstructured text (e.g., a login failure category or a pop-up interruption category). In this case, the scheduling platform 102 may modify the task and/or determine the second assignment of tasks to computing resources 106 based on the error category.

Additionally, or alternatively, the scheduling platform 102 may receive feedback information from a feedback stream. For example, feedback device 110 may provide the feedback information, which may be a natural language stream of comments (e.g., a chat log) regarding usage of computing resources 106. In this case, scheduling platform 102 may apply natural language processing and/or sentiment analysis to classify the feedback information. For example, the scheduling platform 102 may determine whether there is a negative sentiment (e.g., using a sentiment analysis algorithm) associated with a computing resource 106 (e.g., the computing resource 106 is running slowly, as a result of task completion, for other users of computing resource 106). In this case, the scheduling platform 102 may re-assign tasks from the computing resource 106 to reduce an impact on other users of computing resource 106, thereby improving user experience and/or reducing a likelihood of delays and/or failures associated with user-performed tasks.

Figure 1D:
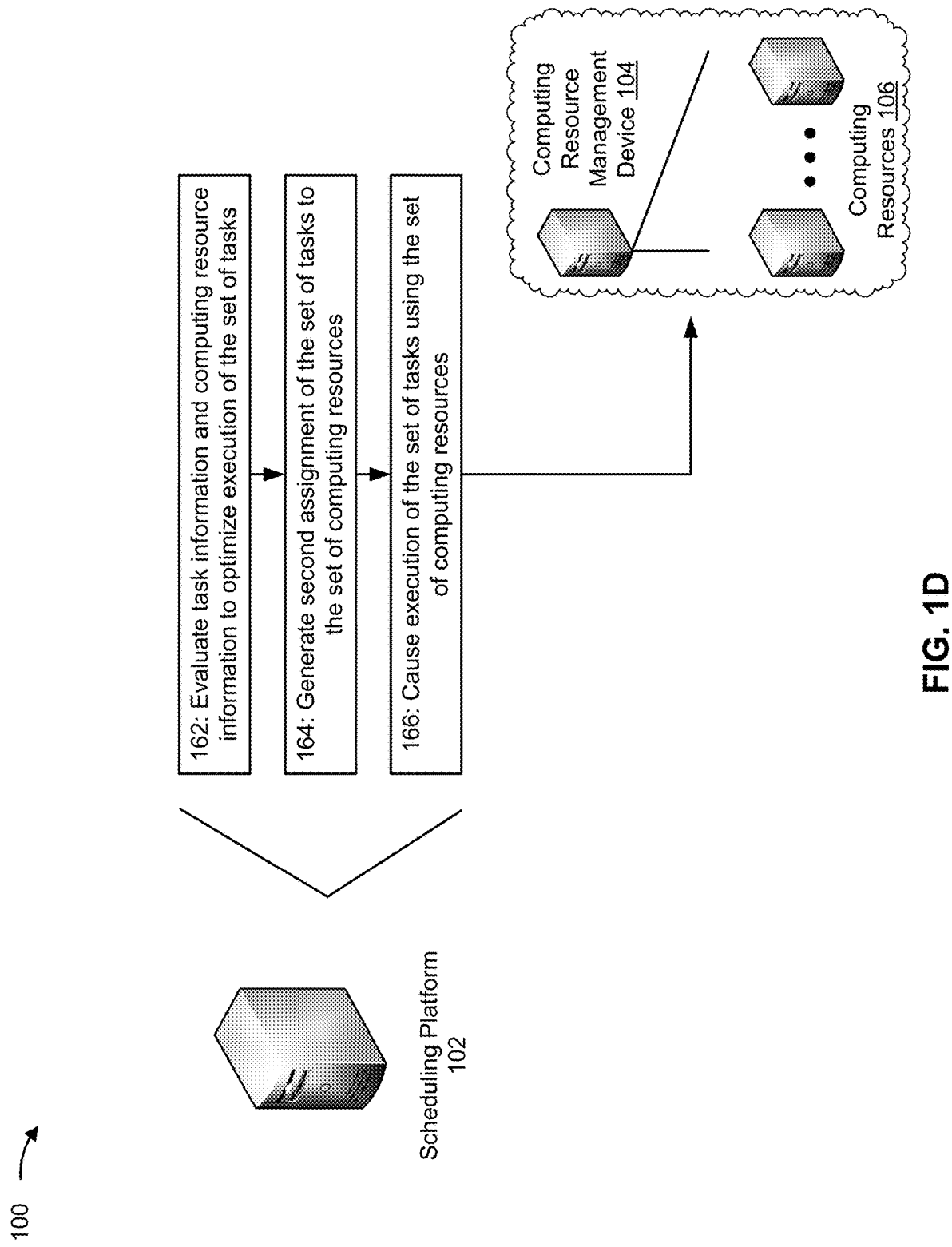

As shown in FIG. 1D, and by reference numbers 162, 164, and 166, the scheduling platform 102 may re-evaluate task information and computing resource information to re-optimize execution of the set of tasks, generate a second assignment of the set of tasks to the set of computing resources 106, and cause execution of the set of tasks using the set of computing resources 106 in accordance with the second assignment. In some implementations, the scheduling platform 102 may transmit one or more alerts associated with the second assignment. For example, the scheduling platform 102 may transmit error information identifying an error or failure that triggered the second assignment or scheduling information identifying the second assignment. Additionally, or alternatively, the scheduling platform 102 may transmit an alert that negative performance issues associated with a computing resource 106 are expected to be resolved by the second assignment and may close a trouble ticket generated based on the feedback information from the feedback stream.

In some implementations, the scheduling platform 102 may provide a user interface view. For example, the scheduling platform 102 may provide a user interface view identifying a status of the set of tasks being executed by the set of computing resources 106. For example, the scheduling platform 102 can indicate whether a task is scheduled, queued, in progress, or finished and may provide information regarding the task and/or a result of completing the task.

In this way, the scheduling platform 102 dynamically updates an assignment of a set of tasks to a set of computing resources 106, thereby ensuring an efficient completion of the set of tasks. Moreover, based on more efficiently assigning the set of tasks to the set of computing resources 106 relative to a static assignment, the scheduling platform 102 may enable utilization of fewer computing resources 106 than a less efficient assignment, thereby reducing a utilization of resources to complete the set of tasks, an energy usage to complete the set of tasks, or a time to complete the set of tasks.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
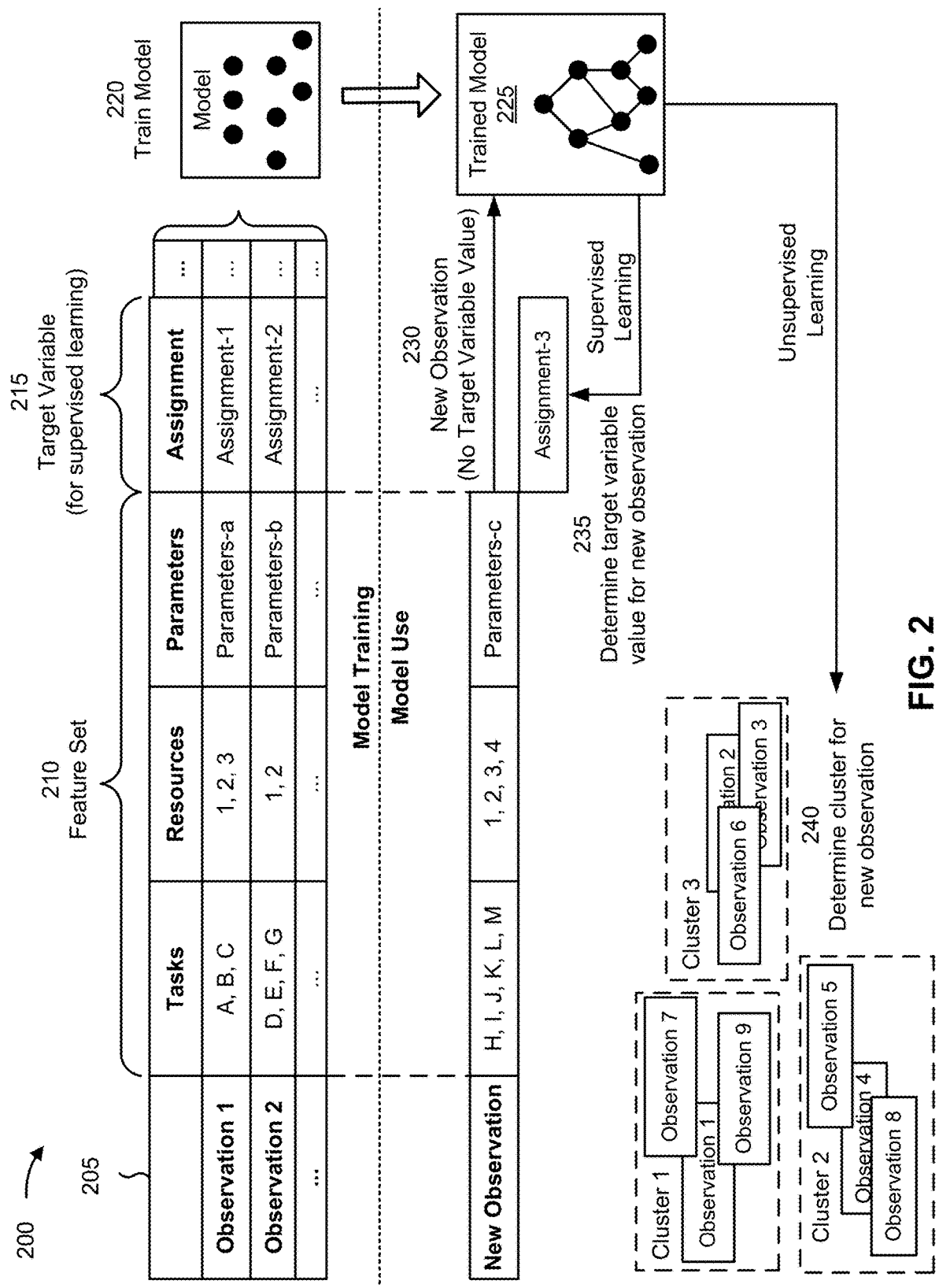
FIG. 2 is a diagram illustrating an example of training and using a machine learning model in connection with dynamic scheduling for automated computing tasks.

FIG. 2 is a diagram illustrating an example 200 of training and using a machine learning model in connection with dynamic scheduling for automated computing tasks. The machine learning model training and usage described herein may be performed using a machine learning system. The machine learning system may include or may be included in a computing device, a server, a cloud computing environment, or the like, such as the scheduling platform 102 of the cloud computing system 302 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from client device 330, computing resource management device 340, or computing resources 350, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from client device 330, computing resource management device 340, or computing resources 350. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a set of tasks for execution, a second feature of a set of computing resources to execute the set of tasks, a third feature of a set of parameters of the set of tasks and the set of resources (e.g., the computing resource information and the task information), and so on. As shown, for a first observation, the first feature may have a value of "A, B, C", the second feature may have a value of "1, 2, 3", the third feature may have a value of "Parameters-a", and so on. These features and feature values are provided as examples, and may differ in other examples. For example, the feature set may include one or more of the following features: a success rate, an availability, a capacity, a failure reason, or a result of a sentiment analysis, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is an assignment of a task to a resource in a particular order, which has a value of "Assignment-1" (e.g., tasks A, B, and C are assigned to resources 1, 2, and 3 for execution in a particular order and/or mapping) for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As an example, the machine learning system may obtain training data for the set of observations based on communicating with computing resource management device 340 (e.g., to receive computing resource information) and client device 330 (e.g., to receive task information). For example, the machine learning system may receive historical computing resource information, task information, and assignments to train a model for assigning tasks to resources to optimize an amount of time and/or resources used to successfully complete execution of the tasks.

As shown by reference number 230, the machine learning system may apply the trained machine learning model 225 to a new observation, such as by receiving a new observation and inputting the new observation to the trained machine learning model 225. As shown, the new observation may include a first feature of a set of tasks "D, E, F, G", a second feature of 3a set of resources "1, 2", a third feature of a set of parameters "Parameters-b", and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of "an assignment-3" for a set of tasks "H, I, J, K, L, M" to a set of computing resources "1, 2, 3, 4" and with a set of parameters "Parameters-c", as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, recommending execution of the set of tasks in accordance with the assignment, recommending modifying a task, or recommending modifying a computing resource, among other examples. The first automated action may include, for example, executing the set of tasks in accordance with the assignment, automatically modifying a task, automatically modifying a computing resource, or setting a threshold time for determining a task failure, among other examples.

In some implementations, the trained machine learning model 225 may classify (e.g., cluster) the new observation in a cluster, as shown by reference number 240. The observations within a cluster may have a common parameter. As an example, the machine learning system may use clustering to assign tasks (e.g., the observations 1 through 9, as shown) into clusters, which correspond to computing resources on which the tasks are to be executed. In this case, each cluster may also be associated with, for example, an order with which the tasks are to be executed.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include a result of executing the set of tasks in accordance with an assignment (e.g., a success in executing the set of tasks, a failure in executing a task, an amount of time to execute the set of tasks, or an amount of computing resources to execute the set of tasks).

In this way, the machine learning system may apply a rigorous and automated process to generate an assignment of tasks to computing resources for execution. The machine learning system enables recognition and/or identification of tens, hundreds, thousands, or millions of features and/or feature values for tens, hundreds, thousands, or millions of observations, thereby increasing accuracy and consistency and reducing delay associated with executing tasks using a set of computing resources relative to requiring computing resources to be allocated for tens, hundreds, or thousands of operators to manually generate a static assignment of tasks to the set of computing resources using the features or feature values.

As indicated above, FIG. 2 is provided as an example. Other examples may differ from what is described in connection with FIG. 2.

Figure 3:
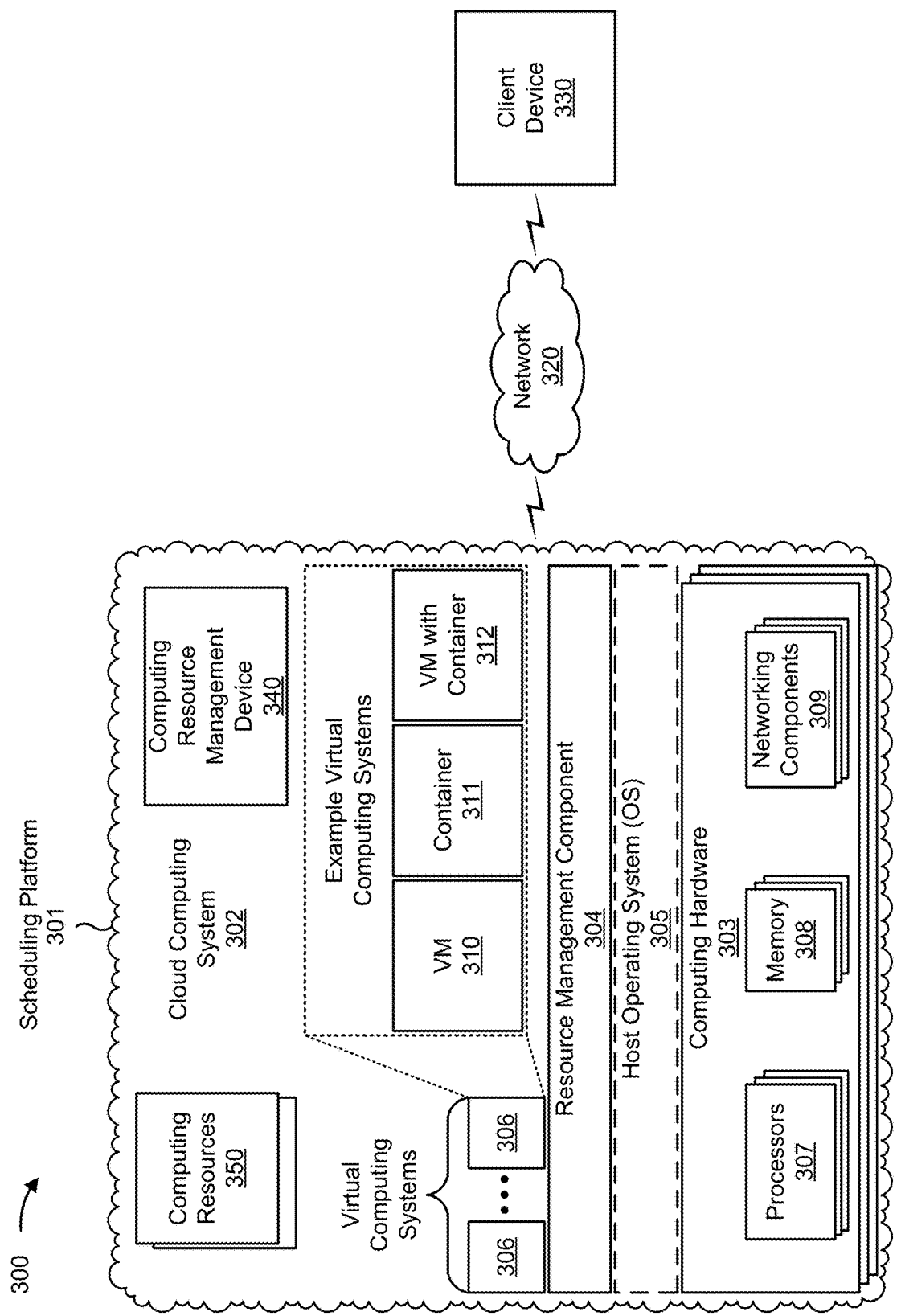
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a scheduling platform 301, which may include one or more elements of and/or may execute within a cloud computing system 302. The cloud computing system 302 may include one or more elements 303-312, as described in more detail below. As further shown in FIG. 3, environment 300 may include a network 320, a client device 330, a computing resource management device 340, and/or a set of computing resources 350 (e.g., which may correspond to computing hardware 303 and/or virtual computing systems 306, among other examples). Although the computing resource management device 340 and the set of computing resources 350 are shown as part of cloud computing system 302 and scheduling platform 301, the computing resource management device 340 and the set of computing resources 350 may be implemented in a different computing environment (e.g., another cloud computing environment or a non-cloud computing environment). Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the scheduling platform 301 may include one or more elements 303-312 of the cloud computing system 302, may execute within the cloud computing system 302, and/or may be hosted within the cloud computing system 302, in some implementations, the scheduling platform 301 may not be cloud-based (e.g., may be implemented outside of a cloud computing system) or may be partially cloud-based. For example, the scheduling platform 301 may include one or more devices that are not part of the cloud computing system 302, such as device 400 of FIG. 4, which may include a standalone server or another type of computing device. The scheduling platform 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

The client device 330 includes one or more devices capable of receiving, generating, storing, processing, and/or providing information associated with an assignment of a set of tasks to a set of computing resources for execution, as described elsewhere herein. The client device 330 may include a communication device and/or a computing device. For example, the client device 330 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The computing resource management device 340 may include one or more devices capable of receiving, generating, storing, processing, and/or providing information associated with the set of computing resources 350. For example, the computing resource management device 340 may correspond to resource management component 304.

The computing resources 350 may include one or more computing resources capable of automatically completing a task, such as an RPA task. For example, the computing resources 350 may correspond to the computing hardware 303 (e.g., the processors 307, the memory 308, or the network components 309), the virtual computing systems 306, or a set of physical computing systems (not shown), such as a set of personal computing devices (e.g., via a remote access communication link).

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
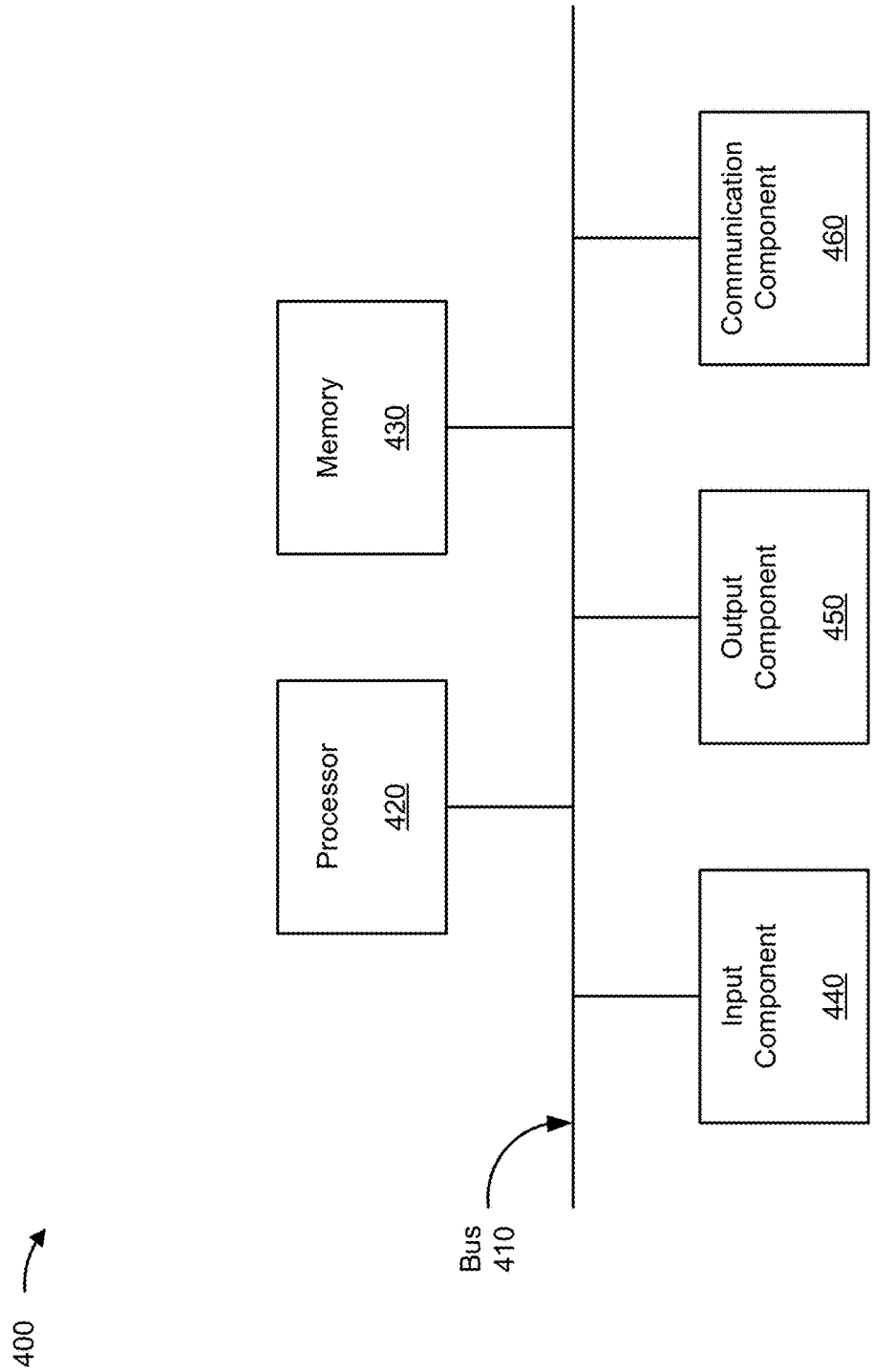
FIG. 4 is a diagram of example components of a device associated with dynamic scheduling for automated computing tasks.

FIG. 4 is a diagram of example components of a device 400 associated with dynamic scheduling for automated computing tasks. Device 400 may correspond to scheduling platform 301, client device 330, computing resource management device 340, and/or computing resources 350. In some implementations, scheduling platform 301, client device 330, computing resource management device 340, and/or computing resources 350 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5A:
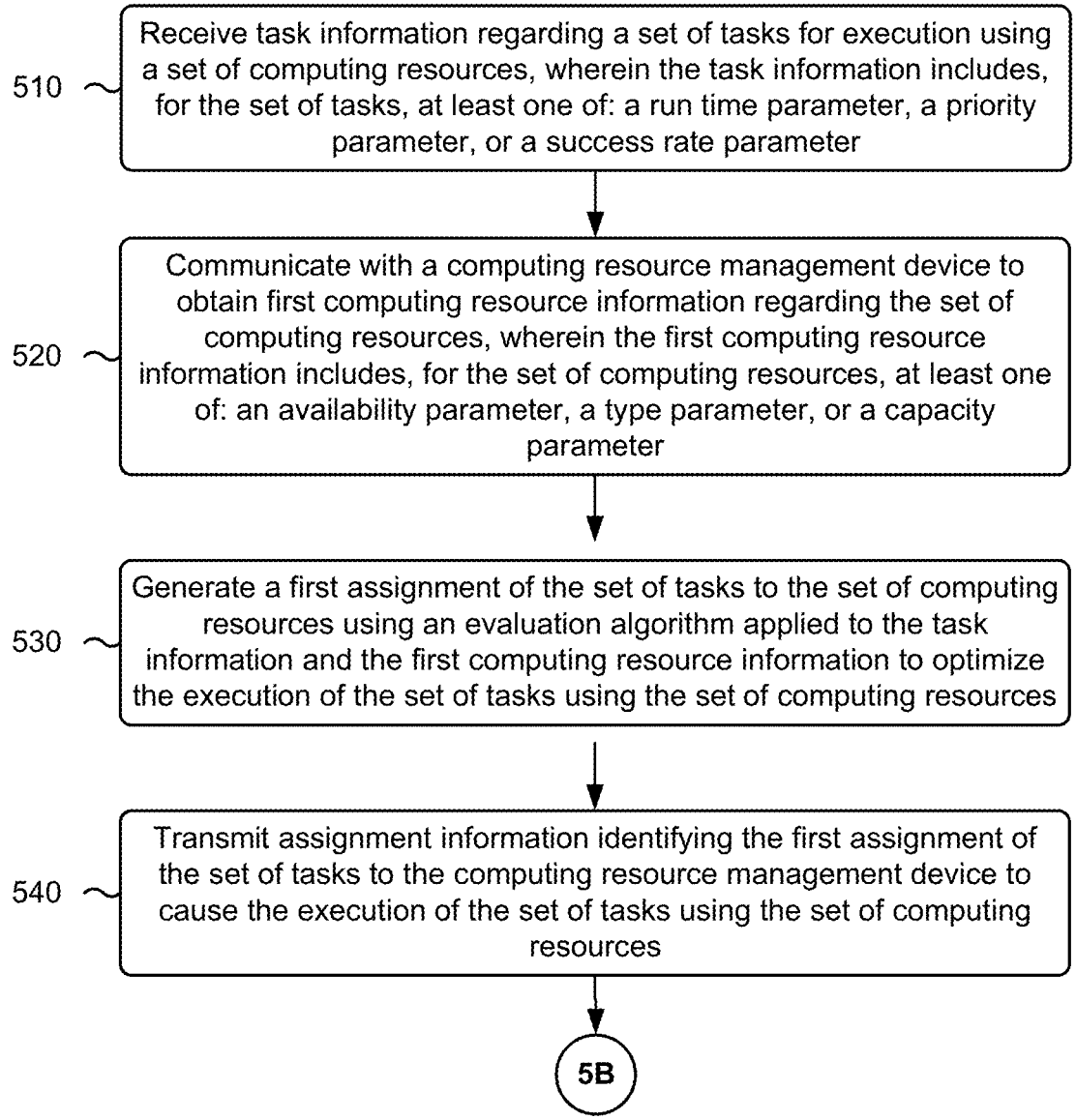
FIGS. 5A and 5B depict a flowchart of an example process associated with dynamic scheduling for automated computing tasks.
Figure 5B:
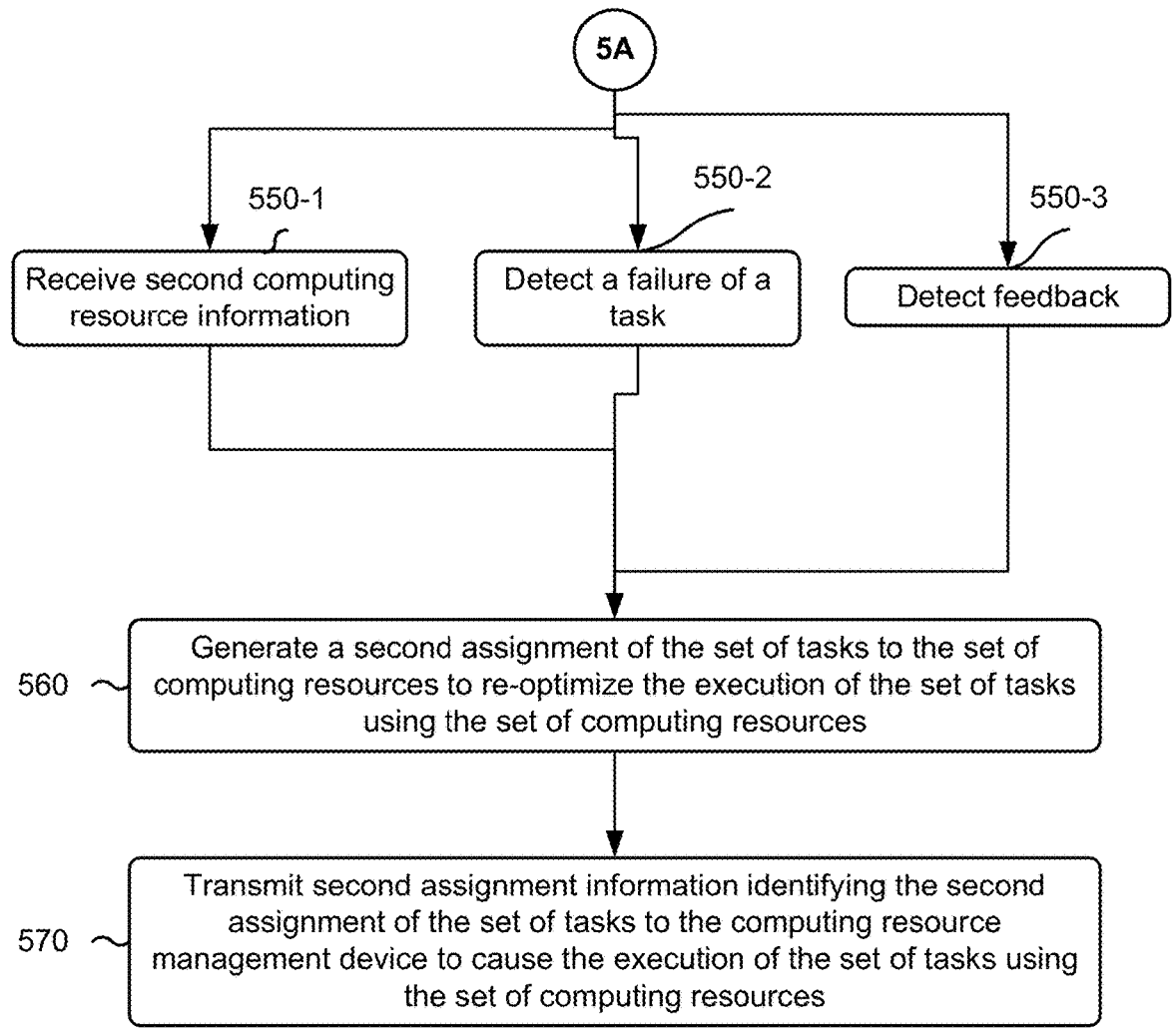

FIGS. 5A and 5B depict a flowchart of an example process 500 associated with dynamic scheduling for automated computing tasks. In some implementations, one or more process blocks of FIG. 5 are performed by a scheduling platform (e.g., scheduling platform 102 or scheduling platform 301). In some implementations, one or more process blocks of FIGS. 5A and 5B are performed by another device or a group of devices separate from or including the scheduling platform, such as a client device (e.g., client device 108 or client device 330), a computing resource management device (e.g., computing resource management device 104 or computing resource management device 340), and/or a computing resource (e.g., computing resources 106 or computing resources 350). Additionally, or alternatively, one or more process blocks of FIGS. 5A and 5B may be performed by one or more components of device 400, such as processor 420, memory 430, input component 440, output component 450, and/or communication component 460.

As shown in FIG. 5A, process 500 may include receiving task information regarding a set of tasks for execution using a set of computing resources, wherein the task information includes, for the set of tasks, at least one of: a run time parameter, a priority parameter, or a success rate parameter (block 510). For example, the scheduling platform may receive task information regarding a set of tasks for execution using a set of computing resources, wherein the task information includes, for the set of tasks, at least one of: a run time parameter, a priority parameter, or a success rate parameter, as described above.

As further shown in FIG. 5A, process 500 may include communicating with a computing resource management device to obtain first computing resource information regarding the set of computing resources, wherein the first computing resource information includes, for the set of computing resources, at least one of: an availability parameter, a type parameter, or a capacity parameter (block 520). For example, the scheduling platform may communicate with a computing resource management device to obtain first computing resource information regarding the set of computing resources, wherein the first computing resource information includes, for the set of computing resources, at least one of: an availability parameter, a type parameter, or a capacity parameter, as described above.

As further shown in FIG. 5A, process 500 may include generating a first assignment of the set of tasks to the set of computing resources using an evaluation algorithm applied to the task information and the first computing resource information to optimize the execution of the set of tasks using the set of computing resources (block 530). For example, the scheduling platform may generate a first assignment of the set of tasks to the set of computing resources using an evaluation algorithm applied to the task information and the first computing resource information to optimize the execution of the set of tasks using the set of computing resources, as described above.

As further shown in FIG. 5A, process 500 may include transmitting assignment information identifying the first assignment of the set of tasks to the computing resource management device to cause the execution of the set of tasks using the set of computing resources (block 540). For example, the scheduling platform may transmit assignment information identifying the first assignment of the set of tasks to the computing resource management device to cause the execution of the set of tasks using the set of computing resources, as described above.

As shown in FIG. 5B, process 500 may include receiving second computing resource information (block 550-1), detecting a failure of a task (block 550-2), or detecting feedback (block 550-3). For example, the scheduling platform may receive, during the execution of the set of tasks using the set of computing resources, second computing resource information, wherein the second computing resource information and the first computing resource information include at least one common parameter with a different value, as described above. Additionally, or alternatively, the scheduling platform may determine that a task has failed to execute successfully, as described above. Additionally, or alternatively, the scheduling platform may detect feedback indicating a negative sentiment regarding operation of a set of computing resources, as described above.

As further shown in FIG. 5B, process 500 may include generating a second assignment of the set of tasks to the set of computing resources to re-optimize the execution of the set of tasks using the set of computing resources (block 560). For example, the scheduling platform may generate a second assignment of the set of tasks to the set of computing resources using the evaluation algorithm applied to the task information and the second computing resource information to re-optimize the execution of the set of tasks using the set of computing resources, as described above.

As further shown in FIG. 5B, process 500 may include transmitting second assignment information identifying the second assignment of the set of tasks to the computing resource management device to cause the execution of the set of tasks using the set of computing resources (block 570). For example, the scheduling platform may transmit second assignment information identifying the second assignment of the set of tasks to the computing resource management device to cause the execution of the set of tasks using the set of computing resources, as described above.

Process 500 may include additional implementations, such as any single implementation or any combination of implementations described below and/or in connection with one or more other processes described elsewhere herein.

In a first implementation, generating the first assignment of the set of tasks to the set of computing resources comprises determining a resource utilization for a task of the set of tasks, determining a threshold resource availability for a computing resource of the set of computing resources, and assigning the task to the computing resource based on the resource utilization and the threshold resource availability.

In a second implementation, alone or in combination with the first implementation, communicating with the computing resource management device to obtain the first computing resource information comprises querying one or more computing devices to determine status information for the one or more computing devices, wherein the status information includes information identifying whether a computing device is locked, online, logged on, or offline, and determining whether to deploy the computing device for task execution based on the status information, and wherein generating the first assignment of the set of tasks to the set of computing resources comprises assigning a task, of the set of tasks, to a computing resource based on determining whether to deploy the computing device for task execution.

In a third implementation, alone or in combination with one or more of the first and second implementations, communicating with the computing resource management device to obtain the first computing resource information comprises querying one or more computing devices to determine whether a software resource is present on the one or more computing devices, and generating the first assignment of the set of tasks to the set of computing resources comprises assigning a task, of the set of tasks, to a computing resource based on querying the one or more computing devices to determine whether the software resource is present on the one or more computing devices.

In a fourth implementation, alone or in combination with one or more of the first through third implementations, process 500 includes deploying the software resource to a computing device, of the one or more computing devices, based on querying the one or more computing devices to determine whether the software resource is present on the one or more computing devices, and assigning the task comprises assigning the task based on deploying the software resource to the computing device.

In a fifth implementation, alone or in combination with one or more of the first through fourth implementations, generating the first assignment of the set of tasks to the set of computing resources using the evaluation algorithm comprises executing a genetic algorithm on at least one of the priority parameter, the run time parameter, the success rate parameter, or a failure reason parameter to determine a scheduling of the set of tasks.

In a sixth implementation, alone or in combination with one or more of the first through fifth implementations, process 500 includes determining the run time parameter based on a probability density function applied to a set of historical run times for a set of historical tasks.

In a seventh implementation, alone or in combination with one or more of the first through sixth implementations, process 500 includes detecting a failure of a task, of the set of tasks, on a computing resource of the set of computing resources, and generating the second assignment comprises generating the second assignment based on detecting the failure of the task.

In an eighth implementation, alone or in combination with one or more of the first through seventh implementations, process 500 includes detecting a failure of a task, of the set of tasks, on a computing resource of the set of computing resources, obtaining an image of a screen associated with the failure of the set of tasks, applying an optical character recognition algorithm to parse the image of the screen, and applying a natural language processing algorithm to an output of the optical character recognition algorithm, wherein an output of the natural language processing algorithm includes information identifying a characteristic of the failure of the task, and wherein generating the second assignment comprises generating the second assignment based on the characteristic of the failure of the task.

In a ninth implementation, alone or in combination with one or more of the first through eighth implementations, process 500 includes detecting a failure of a task, of the set of tasks, on a computing resource of the set of computing resources, and obtaining an error log associated with the failure of the set of tasks, wherein the error log includes information identifying a characteristic of the failure of the task, and wherein generating the second assignment comprises generating the second assignment based on the characteristic of the failure of the task.

In a tenth implementation, alone or in combination with one or more of the first through ninth implementations, the error log includes unstructured text, wherein the unstructured text includes at least one of a file path, a code line number, or a descriptive string.

In an eleventh implementation, alone or in combination with one or more of the first through tenth implementations, process 500 includes applying a natural language processing algorithm to classify the failure of the task into an error category based on the unstructured text, and generating the second assignment comprises generating the second assignment based on classifying the failure of the task into the error category.

In a twelfth implementation, alone or in combination with one or more of the first through eleventh implementations, process 500 includes detecting a failure of a task, of the set of tasks, on a computing resource of the set of computing resources, obtaining an image of a screen associated with the failure of the set of tasks, and applying an object recognition algorithm to parse the image of the screen, wherein an output of the object recognition algorithm includes information identifying a characteristic of the failure of the task, and wherein generating the second assignment comprises generating the second assignment based on the characteristic of the failure of the task.

In a thirteenth implementation, alone or in combination with one or more of the first through twelfth implementations, process 500 includes classifying a computing resource, of the set of computing resources, based on the first computing resource information, and generating the first assignment comprises generating the first assignment based on classifying the computing resource.

In a fourteenth implementation, alone or in combination with one or more of the first through thirteenth implementations, a classification of the computing resource includes a type of hardware providing the computing resource, wherein the type of hardware includes at least one of a central processing unit, a graphical processing unit, an audio processing unit, a network card, a field programmable gate array, or a system-on-chip.

In a fifteenth implementation, alone or in combination with one or more of the first through fourteenth implementations, process 500 includes monitoring a feedback stream to detect feedback relating to the set of computing resources, and classifying the feedback relating to the set of computing resources, and generating the second assignment comprises generating the second assignment based on the feedback relating to the set of computing resources.

In a sixteenth implementation, alone or in combination with one or more of the first through fifteenth implementations, classifying the feedback comprises executing a sentiment analysis algorithm to determine a sentiment associated with a computing resource of the set of computing resources, and generating the second assignment comprises generating the second assignment based on the sentiment associated with the computing resource.

In a seventeenth implementation, alone or in combination with one or more of the first through sixteenth implementations, process 500 includes transmitting an alert associated with the second assignment, wherein the alert includes information identifying at least one of error information regarding a task, of the set of tasks, or scheduling information regarding the second assignment.

Although FIGS. 5A and 5B show example blocks of process 500, in some implementations, process 500 includes additional blocks, fewer blocks, different blocks, or differently arranged blocks than those depicted in FIGS. 5A and 5B. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method executed by a scheduling platform, comprising:
receiving task information regarding a set of tasks for execution using a set of computing resources, wherein the task information includes, for the set of tasks, at least a run time parameter based on a probability density function applied to a set of historical run times for a set of historical tasks;
communicating with a computing resource management device to obtain first computing resource information regarding the set of computing resources, wherein the first computing resource information includes, for the set of computing resources, at least one of an availability parameter, a type parameter, or a capacity parameter;
transmitting, to the computing resource management device, first assignment information identifying a first assignment of the set of tasks to the set of computing resources to cause optimal execution of the set of tasks using the set of computing resources, wherein the first assignment is based on a genetic algorithm applied to the task information and the first computing resource information;
receiving, during the execution of the set of tasks using the set of computing resources, second computing resource information, wherein the second computing resource information and the first computing resource information include at least one common parameter with a different value;
and
transmitting, to the computing resource management device, second assignment information identifying a second assignment of the set of tasks to the set of computing resources to cause re-optimized execution of the set of tasks using the set of computing resources, wherein the second assignment is based on the genetic algorithm applied to the task information and the second computing resource information.

2. The method of claim 1, wherein the first assignment of the set of tasks to the set of computing resources is based on a resource utilization for a task of the set of tasks and a threshold resource availability for a computing resource of the set of computing resources.

3. The method of claim 1, wherein communicating with the computing resource management device to obtain the first computing resource information comprises:
querying one or more computing devices to obtain status information for the one or more computing devices, wherein the status information includes information identifying whether a computing device is locked, online, logged on, or offline; and
deploying the one or more computing devices for task execution based on the status information, wherein the first assignment is further based on the deploying.

4. The method of claim 1, wherein communicating with the computing resource management device to obtain the first computing resource information comprises:
querying one or more computing devices to obtain information indicating whether a software resource is present on the one or more computing devices, wherein the first assignment is further based on the querying.

5. The method of claim 4, further comprising:
deploying the software resource to a computing device of the one or more computing devices based on the querying, wherein the first assignment is further based on the deploying.

6. The method of claim 1, wherein the task information further comprises at least one of a priority parameter, a success rate parameter, or a failure reason parameter.

7. The method of claim 6, wherein the second assignment is further based on a type of a failure of a task of the set of tasks.

8. A scheduling platform, comprising:
one or more memories; and
one or more processors, coupled to the one or more memories, configured to:
receive task information regarding a set of tasks for execution using a set of computing resources, wherein the task information includes, for the set of tasks, at least a run time parameter based on a probability density function applied to a set of historical run times for a set of historical tasks;
communicate with a computing resource management device to obtain first computing resource information regarding the set of computing resources, wherein the first computing resource information includes, for the set of computing resources, at least one of: an availability parameter, a type parameter, or a capacity parameter;
transmit, to the computing resource management device, first assignment information identifying a first assignment of the set of tasks to the set of computing resources to cause optimal execution of the set of tasks using the set of computing resources, wherein the first assignment is based on a genetic algorithm applied to the task information and the first computing resource information; and
transmit, to the computing resource management device, second assignment information identifying a second assignment of the set of tasks to the set of computing resources to cause re-optimized execution of the set of tasks using the set of computing resources, wherein the second assignment is based on the genetic algorithm applied to the task information and the second computing resource information, and wherein the second assignment is further based on a failure of a task of the set of tasks on a computing resource of the set of computing resources.

9. The scheduling platform of claim 8, wherein the second assignment is further based on a type of the failure of the task.

10. The scheduling platform of claim 8, wherein:
the second assignment is based on a characteristic of the failure of the task,
the characteristic is based on an output of a natural language processing algorithm applied to an output of an optical character recognition algorithm, the output of the natural language processing algorithm includes information identifying the characteristic,
the optical character recognition algorithm parses an image of a screen, and
the image of the screen is associated with the failure of the task of the set of tasks.

11. The scheduling platform of claim 8, wherein the one or more processors are further configured to:
obtain an error log associated with the failure of the task of the set of tasks, wherein the error log includes information identifying a characteristic of the failure of the task, and wherein the second assignment is further based on the characteristic of the failure of the task.

12. The scheduling platform of claim 11, wherein the error log includes unstructured text including at least one of: a file path, a code line number, or a descriptive string.

13. The scheduling platform of claim 12, wherein:
a classification of the failure of the task into an error category is based on the unstructured text,
the second assignment is based on the classification, and
the classification is based on a natural language processing algorithm.

14. The scheduling platform of claim 8, wherein:
the second assignment is based on information identifying a characteristic of the failure of the task,
the information is based on an output of an object recognition algorithm,
the object recognition algorithm parses an image of a screen, and
the image of the screen is associated with the failure of the task.

15. A non-transitory computer-readable medium storing a set of instructions, the set of instructions comprising:
one or more instructions that, when executed by one or more processors of a scheduling platform, cause the scheduling platform to:
receive task information regarding a set of tasks for execution using a set of computing resources, wherein the task information includes, for the set of tasks, at least a run time parameter based on a probability density function applied to a set of historical run times for a set of historical tasks;
communicate with a computing resource management device to obtain first computing resource information regarding the set of computing resources, wherein the first computing resource information includes, for the set of computing resources, at least one of: an availability parameter, a type parameter, or a capacity parameter;
transmit, to the computing resource management device, first assignment information identifying a first assignment of the set of tasks to the set of computing resources to cause optimal execution of the set of tasks using the set of computing resources, wherein the first assignment is based on a genetic algorithm applied to the task information and the first computing resource information;
receive feedback from a feedback stream relating to the set of computing resources;
and
transmit, to the computing resource management device, second assignment information identifying a second assignment of the set of tasks to the set of computing resources to cause re-optimized execution of the set of tasks using the set of computing resources, wherein the second assignment is based on the genetic algorithm applied to the task information and the second computing resource information, and wherein the second assignment is further based on the feedback.

16. The non-transitory computer-readable medium of claim 15, wherein:
the first assignment is based on a classification of a computing resource of the set of computing resources, and
the classification is based on the first computing resource information.

17. The non-transitory computer-readable medium of claim 16, wherein the classification of the computing resource includes a type of hardware providing the computing resource, and wherein the type of hardware includes at least one of a central processing unit, a graphical processing unit, an audio processing unit, a network card, a field programmable gate array, or a system-on-chip.

18. The non-transitory computer-readable medium of claim 15, wherein the second assignment is based on a classification of the feedback.

19. The non-transitory computer-readable medium of claim 18, wherein the second assignment is based on a sentiment associated with a computing resource of the set of computing resources, and wherein the sentiment is based on a sentiment algorithm.

20. The non-transitory computer-readable medium of claim 15, wherein the one or more instructions further cause the scheduling platform to:
transmit an alert associated with the second assignment, wherein the alert includes information identifying at least one of error information regarding a task of the set of tasks, or scheduling information regarding the second assignment.

* * * * *